United States Patent [19]
Hyuga et al.

[11] Patent Number: 5,506,860
[45] Date of Patent: Apr. 9, 1996

[54] ETALON AND SINGLE-LONGITUDINAL-MODE LASER USING THE SAME

[75] Inventors: Hiroaki Hyuga; Yoji Okazaki; Chiaki Goto, all of Kanagawa, Japan

[73] Assignee: Fuji Photo Film Co., Ltd., Kanagawa, Japan

[21] Appl. No.: 323,666

[22] Filed: Oct. 17, 1994

[30] Foreign Application Priority Data

Nov. 18, 1993 [JP] Japan ................................ 5-289082

[51] Int. Cl.⁶ ........................................................ H01S 3/08
[52] U.S. Cl. ................................. 372/98; 372/92; 372/19; 372/21
[58] Field of Search ................................. 372/21, 22, 98, 372/92, 19

[56] References Cited

U.S. PATENT DOCUMENTS 4,656,635  4/1987  Baer et al.

OTHER PUBLICATIONS

C. S. Adams et al., Single–Frequency Operation Of A Diode–Pumped Lanthanum–Neodymium–Hexaaluminate Laser By Using A Twisted–Mode Cavity, Optics Letters/vol. 18, No. 6, Mar. 15, 1993 (P420–422).

*Primary Examiner*—Leon Scott, Jr.
*Attorney, Agent, or Firm*—Sughrue, Mion, Zinn, Macpeak & Seas

[57] ABSTRACT

A single-longitudinal-mode laser comprises a laser medium, an etalon, and a resonator. The etalon is located in the resonator in a state such that two light passage end faces of the etalon, which are parallel to each other, may make a predetermined angle with respect to a resonator axis. The longitudinal mode of the etalon coincides with a gain peak wavelength of the laser medium. The single-longitudinal-mode laser is free from the problems in that the threshold value of the pumping power for the oscillation of the laser becomes large, in that the output power of the laser becomes low, in that the profile of the radiated beam becomes distorted, and in that the single longitudinal mode characteristics become bad.

9 Claims, 5 Drawing Sheets

F I G. 6
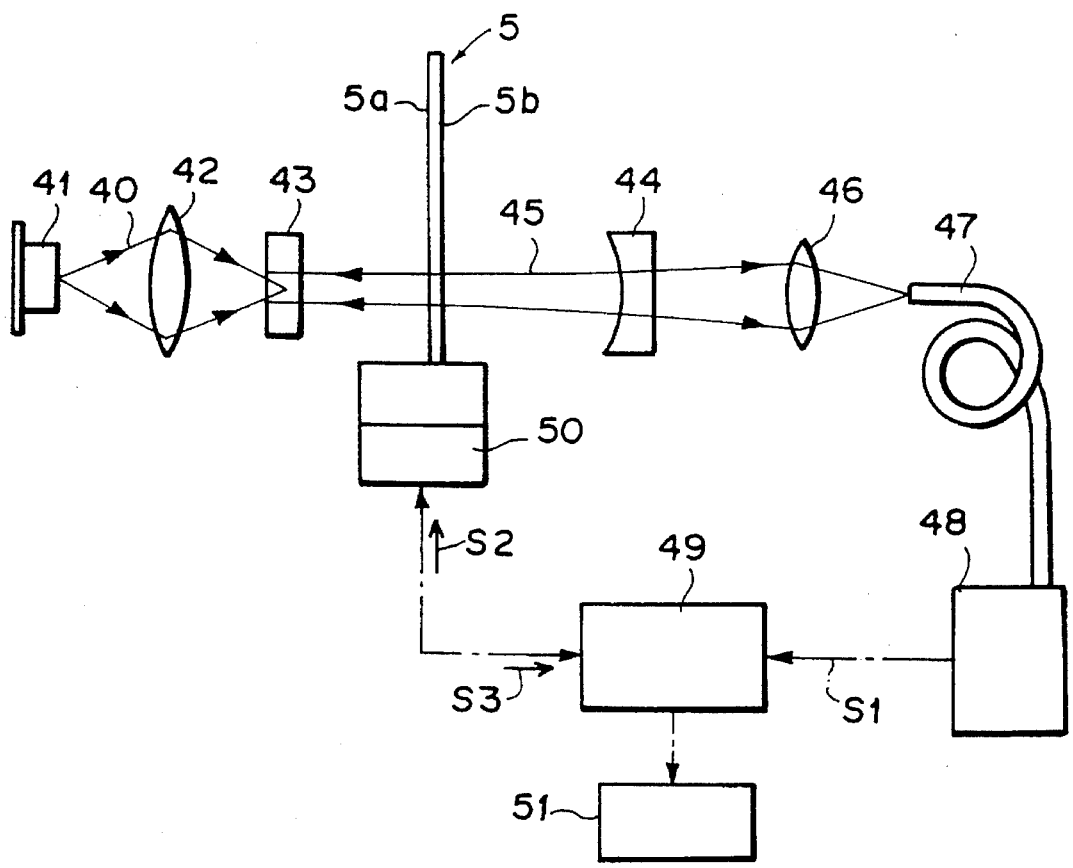
F I G. 7
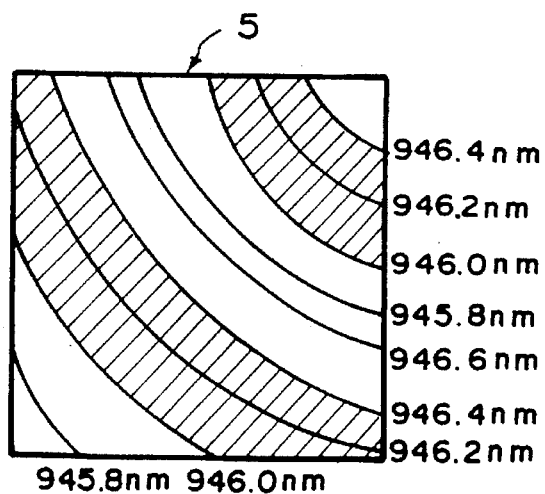

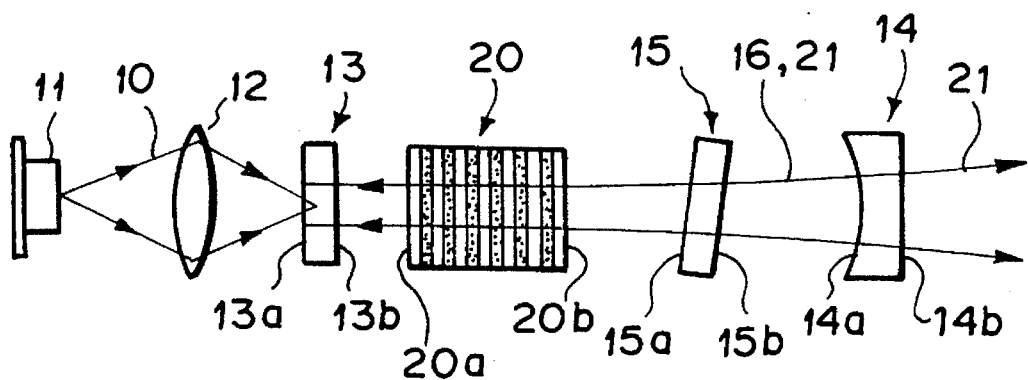
F I G. 10

ETALON AND SINGLE-LONGITUDINAL-MODE LASER USING THE SAME

BACKGROUND OF THE INVENTION

1. Field of the Invention

This invention relates to a laser. This invention particularly relates to a laser, wherein an etalon is located in a laser resonator in order to bring the oscillation mode to a single longitudinal mode. This invention also relates to an etalon for use in the laser and a method for making the etalon.

2. Description of the Prior Art

Laser diode pumped solid lasers have been proposed in, for example, U.S. Pat. No. 4,656,635. The proposed laser diode pumped solid lasers comprise a solid laser rod, which has been doped with a rare earth metal, such as neodymium (Nd). The solid laser rod is pumped by a semiconductor laser (a laser diode).

As described in, for example, Optics Letters, Vol. 18, 1993, p. 420, in the laser diode pumped solid laser of this type, an etalon is often located in the laser resonator in order to effect wavelength selection and to bring the oscillation mode to the single longitudinal mode such that the occurrence of noise due to mode competition can be restricted.

However, with the conventional laser in which an etalon is used in order to bring the oscillation mode to the single longitudinal mode, the threshold value of the pumping power for the oscillation of the laser becomes markedly large. As a result, the problems often occur in that, for example, the output power of the laser becomes low. The increase in the threshold value occurs because the etalon longitudinal mode intervals are set to be sufficiently large with respect to the wavelength width of the laser beam capable of being radiated from the laser medium. Such setting of the etalon longitudinal mode intervals is carried out in order to prevent the problems from occurring in that a plurality of etalon longitudinal modes occur in the wavelength width of the laser beam capable of being radiated from the laser medium and the oscillation mode cannot be brought to the single longitudinal mode.

Specifically, in general, in such a structure, if the thickness of the etalon is not controlled to the submicron order, the etalon longitudinal mode and the gain peak wavelength of the laser medium will not coincide with each other. In such cases, the gain is not utilized efficiently, and therefore the oscillation threshold value becomes large.

It is very difficult to control the thickness of the etalon to the submicron order by a polishing process. Even if such control is possible, a very high cost will be required to carry out such control. Therefore, an attempt has heretofore been made to adjust the optical path length of the etalon by adjusting the inclination of the etalon, which is inserted into the resonator, with respect to the resonator axis such that the etalon longitudinal mode and the gain peak wavelength of the laser medium may coincide with each other.

However, if the inclination of the etalon becomes very large, etalon insertion loss will become large. Therefore, the threshold value of the pumping power for the oscillation of the laser will become large, and the problems will occur in that, for example, the output power of the laser becomes low. If the inclination of the etalon is very small, the required level of the output power of the laser can be obtained, but the problems will occur in that, for example, the single longitudinal mode characteristics become bad. Also, in cases where laser apparatuses are to be massproduced, it is necessary to carry out the adjustment of the angle of the etalon for each of the laser apparatuses. Therefore, the problems occur in that the productivity becomes low, and the specifications, such as the threshold value of the pumping power for the oscillation of the laser, and the output power of the laser, vary for different laser apparatuses. Further, in cases where it is necessary for the etalon to be inclined at a large angle for the purposes of the adjustment of the optical path length, the problems occur in that the profile of the radiated beam becomes distorted due to such inclination of the etalon.

SUMMARY OF THE INVENTION

The primary object of the present invention is to provide a single-longitudinal-mode laser, which is free from the problems in that the threshold value of the pumping power for the oscillation of the laser becomes large and in that the output power of the laser becomes low.

Another object of the present invention is to provide a single-longitudinal-mode laser, which is free from the problems in that the profile of the radiated beam becomes distorted and in that the single longitudinal mode characteristics become bad.

A further object of the present invention is to provide an etalon for use in the single-longitudinal-mode laser.

A still further object of the present invention is to provide a method for making the etalon comparatively simply and at a low cost.

The present invention provides an etalon, which is to be located in a resonator of a laser apparatus provided with a laser medium and which brings a laser beam to a single longitudinal mode, wherein the etalon is located in a state such that the laser beam may impinge at a predetermined angle upon two light passage end faces of the etalon, which are parallel to each other, and wherein the longitudinal mode of the etalon coincides with a gain peak wavelength of the laser medium.

The present invention also provides a single-longitudinal-mode laser comprising a laser medium; an etalon, and a resonator, wherein the etalon is located in the resonator in a state such that two light passage end faces of the etalon, which are parallel to each other, may make a predetermined angle with respect to a resonator axis, and wherein the longitudinal mode of the etalon coincides with a gain peak wavelength of the laser medium.

In the single-longitudinal-mode laser in accordance with the present invention, the etalon should preferably be located in the resonator in a state such that the two light passage end faces of the etalon, which are parallel to each other, may be approximately normal to the resonator axis.

The present invention further provides a first method for making an etalon, which is to be located in a resonator of a laser apparatus provided with a laser medium and which brings a laser beam to a single longitudinal mode, the method comprising the steps of:

i) irradiating a single-longitudinal-mode laser beam, which has a wavelength identical with a gain peak wavelength of the laser medium of the laser apparatus, to an etalon base plate, which has an area larger than the area of a desired etalon, from the side of one surface of the etalon base plate, ii) investigating interference fringes formed by the single-longitudinal-mode laser beam, which has passed through the etalon base plate, iii) subdividing a portion of the etalon base plate, which corresponds to a predetermined brightness portion in the interference fringes, into small pieces, and iv) taking each of the resulting small pieces as the etalon.

The present invention still further provides a second method for making an etalon, which is to be located in a resonator of a laser apparatus provided with a laser medium and which brings a laser beam to a single longitudinal mode, the method comprising the steps of:

i) inserting an etalon base plate, which has an area larger than the area of a desired etalon, into a resonator of an evaluation laser apparatus provided with the same laser medium as the laser medium of the laser apparatus, for which the etalon is to be used, ii) two-dimensionally scanning the etalon base plate with an evaluation laser beam, which has been produced by the evaluation laser apparatus, iii) measuring the oscillation wavelength of the evaluation laser beam, which has passed through the etalon base plate, during the two-dimensional scanning of the etalon base plate, iv) creating a map, which represents the oscillation wavelength for each of different positions on the etalon base plate, v) subdividing a portion of the etalon base plate, which is represented by the map and at which the oscillation wavelength is identical with a gain peak wavelength of the laser medium, into small pieces, and vi) taking each of the resulting small pieces as the etalon.

The present invention also provides a third method for making an etalon, which is to be located in a resonator of a laser apparatus provided with a laser medium and which brings a laser beam to a single longitudinal mode, the method comprising the steps of:

i) subdividing an etalon base plate, which has an area larger than the area of a desired etalon, into a plurality of small pieces, ii) inserting the resulting small pieces one after another into a resonator of an evaluation laser apparatus provided with the same laser medium as the laser medium of the laser apparatus, for which the etalon is to be used, iii) measuring the oscillation wavelength of an evaluation laser beam, which has been produced by the evaluation laser apparatus and which has passed through one of the small pieces, for each of the small pieces when the small pieces are inserted one after another into the resonator of the evaluation laser apparatus, iv) selecting a small piece, for which the oscillation wavelength is identical with a gain peak wavelength of the laser medium of the laser apparatus, and v) taking the selected small piece as the etalon.

In the first, second, and third methods for making an etalon in accordance with the present invention, the etalon base plate having a large area is used. It is almost impossible to polish the etalon base plate such that its two surfaces (i.e. the surfaces which serve as the light passage end faces when the etalon base plate is formed into the etalon) may be perfectly parallel to each other. In other words, the etalon base plate inevitably has a thickness distribution. Ordinarily, the etalon base plate contains a portion having a specific thickness such that, when the portion of the etalon base plate is subdivided into etalons, the longitudinal mode of each of the etalons may coincide with the gain peak wavelength of the laser medium.

In the aforesaid first method for making an etalon in accordance with the present invention, the portion of the etalon base plate having such a specific thickness can be identified as the portion, which corresponds to a predetermined brightness portion (i.e. a bright portion or a dark portion) in the interference fringes. Therefore, with the first method for making an etalon in accordance with the present invention, the portion of the etalon base plate, which corresponds to the predetermined brightness portion in the interference fringes, is subdivided into small pieces, and each of the resulting small pieces is taken as the etalon. The etalon, which is thus made, has the characteristics such that the longitudinal mode may coincide with the gain peak wavelength of the laser medium.

In the second method for making an etalon in accordance with the present invention, when the evaluation laser beam passes through the portion of the etalon base plate having the specific thickness described above, the oscillation wavelength of the evaluation laser beam becomes equal to the gain peak wavelength of the laser medium. Therefore, with the second method for making an etalon in accordance with the present invention, the portion of the etalon base plate, at which the oscillation wavelength of the evaluation laser beam is identical with the gain peak wavelength of the laser medium, is subdivided into small pieces, and each of the resulting small pieces is taken as the etalon. The etalon, which is thus made, has the characteristics such that the longitudinal mode may coincide with the gain peak wavelength of the laser medium.

In the third method for making an etalon in accordance with the present invention, in cases where the etalon base plate has the portion with the specific thickness described above, the plurality of small pieces obtained from the etalon base plate contain a small piece having the specific thickness. Therefore, with the third method for making an etalon in accordance with the present invention, the small piece, for which the oscillation wavelength of the evaluation laser beam is identical with the gain peak wavelength of the laser medium, is selected from the plurality of the small pieces and taken as the etalon. The etalon, which is thus made, has the characteristics such that the longitudinal mode may coincide with the gain peak wavelength of the laser medium.

As described above, with the first, second, and third methods for making an etalon in accordance with the present invention, instead of an etalon being polished strictly to a predetermined thickness, on the basis of the consideration that a thickness distribution occurs with an etalon base plate having a large area, a desired etalon is obtained by utilizing a portion of the etalon base plate having the specific thickness. Therefore, with the first, second, and third methods for making an etalon in accordance with the present invention, the etalon, the longitudinal mode of which coincides with the gain peak wavelength of the laser medium, can be made comparatively simply and at a low cost.

With the single-longitudinal-mode laser in accordance with the present invention, the etalon longitudinal mode and the gain peak wavelength of the laser medium coincide with each other. Therefore, the gain can be utilized efficiently. Accordingly, the problems can be prevented from occurring in that the threshold value of the pumping power for the oscillation of the laser becomes large and in that the output power of the laser becomes low.

Also, with the single-longitudinal-mode laser in accordance with the present invention, it is not necessary to adjust the inclination of the etalon for the purposes of adjusting the optical path length. Therefore, the etalon insertion loss can be kept small, and the efficiency of the laser can be kept high. Further, the problems can be prevented from occurring in that the profile of the radiated beam becomes distorted.

Moreover, the single longitudinal mode characteristics can be kept good. Furthermore, a means for adjusting the angle of inclination of the etalon for the purposes of adjusting the optical path length becomes unnecessary, and the cost can be kept low.

With the single-longitudinal-mode laser in accordance with the present invention, the etalon is located in the resonator in a state such that the two light passage end faces of the etalon, which are parallel to each other, may make a predetermined angle with respect to the resonator axis. The predetermined angle should preferably fall within the range of approximately 90°±30'.

The first, second, and third methods for making an etalon in accordance with the present invention are applicable when the etalon to be located at a predetermined angle with respect to the resonator axis is made. Specifically, with the first method for making an etalon in accordance with the present invention, when the single-longitudinal-mode laser beam is irradiated to the etalon base plate, the etalon base plate may be inclined at the predetermined angle with respect to the direction of incidence of the laser beam. With the second method for making an etalon in accordance with the present invention, the etalon base plate may be inclined at the predetermined angle with respect to the resonator axis in the evaluation laser apparatus. Also, with the third method for making an etalon in accordance with the present invention, each of the small pieces subdivided from the etalon base plate may be inclined at the predetermined angle with respect to the resonator axis in the evaluation laser apparatus.

BRIEF DESCRIPTION OF THE DRAWINGS

FIG. 6 is a side view showing an example of an apparatus for carrying out the second method for making an etalon in accordance with the present invention, FIG. 7 is an explanatory view showing a map, which represents the relationship between the oscillation wavelength of an evaluation laser beam in the apparatus of FIG. 6 and the positions on an etalon base plate, FIG. 10 is a side view showing a third embodiment of the single-longitudinal-mode laser in accordance with the present invention.

DESCRIPTION OF THE PREFERRED EMBODIMENTS

The present invention will hereinbelow be described in further detail with reference to the accompanying drawings.

Figure 1:
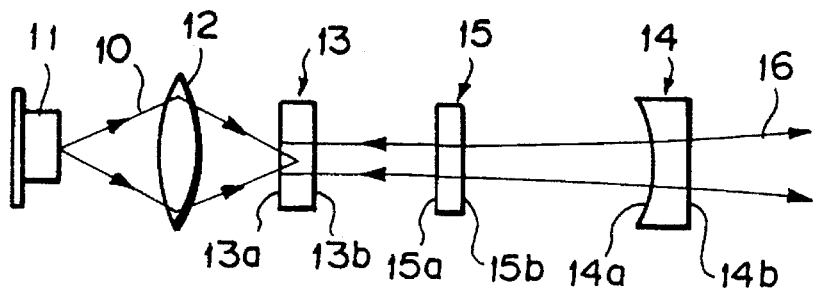
FIG. 1 is a side view showing a first embodiment of the single-longitudinal-mode laser in accordance with the present invention.

FIG. 1 shows a first embodiment of the single-longitudinal-mode laser in accordance with the present invention, which is constituted as a laser diode pumped solid laser. The laser diode pumped solid laser is provided with a semiconductor laser (a phased array laser) 11, which produces a laser beam 10 serving as a pumping beam, and a condensing lens 12, which condenses the laser beam 10 having been produced as divergent light. The laser diode pumped solid laser is also provided with a YAG crystal 13, which is a solid laser medium doped with neodymium (Nd). The YAG crystal 13 doped with neodymium (Nd) will hereinafter be referred to as the Nd:YAG crystal 13. The laser diode pumped solid laser is further provided with a resonator mirror 14, which is located on the side downstream (i.e. the right side in FIG. 1) from the Nd:YAG crystal 13. An etalon 15 is located between the Nd:YAG crystal 13 and the resonator mirror 14. These elements are mounted together with one another on a single case (not shown). Also, the temperature of the phased array laser 11 is kept at a predetermined value by a Peltier device (not shown) and a temperature adjusting circuit (not shown).

The phased array laser 11 produces the laser beam 10 having a wavelength of 809 nm. The Nd:YAG crystal 13 has an Nd concentration of 1 at % and a thickness of 1 mm. The neodymium atoms contained in the Nd:YAG crystal 13 are stimulated by the laser beam 10, and the Nd:YAG crystal 13 thereby produces a solid laser beam 16 having a wavelength of 946.2 nm.

The reflectivities or the transmittances of end faces 13a and 13b of the Nd:YAG crystal 13, light passage end faces 15a and 15b of the etalon 15, and a mirror surface 14a and a light radiating end face 14b of the resonator mirror 14 with respect to the wavelengths described above and different beam radiation lines of 1,064 nm and 1,300 nm of the Nd:YAG crystal 13 are adjusted as listed in the table below by the provision of appropriate coatings. In the table below, R represents the reflectivity in units of %, and T represents the transmittance in units of %.

|  | 13a | 13b | 15a | 15b | 14a | 14b |
|---|---|---|---|---|---|---|
| 809 nm | T ≧ 85 | R ≦ 2 | — | — | — | — |
| 946.2 nm | R ≧ 99.9 | R ≦ 0.1 | R = 15 | R = 15 | R ≧ 98 | R ≦ 0.2 |
| 1064 nm | T ≧ 30 | R ≦ 10 | — | — | T ≧ 30 | R ≦ 10 |
| 1300 nm | T ≧ 70 | R ≦ 25 | — | — | T ≧ 70 | R ≦ 25 |

With the configuration described above, a standing wave having a wavelength of 946.2 nm occurs between the end faces 15a and 15b of the etalon 15. Only the laser beam 16 having a wavelength of 946.2 nm resonates strongly between the end face 13a of the Nd:YAG crystal 13 and the mirror surface 14a. Part of the laser beam 16 is radiated out of the light radiating end face 14b of the resonator mirror 14. It was confirmed that the laser beam 16 is radiated in the single longitudinal mode.

The etalon 15 is a parallel flat plate, in which the end faces 15a and 15b are parallel to each other. The etalon 15 is located such that the normal lines of the end faces 15a and 15b may make an angle of 30' with respect to the axis of the resonator, which is constituted of the end face 13a of the Nd:YAG crystal and the mirror surface 14a.

Figure 2:
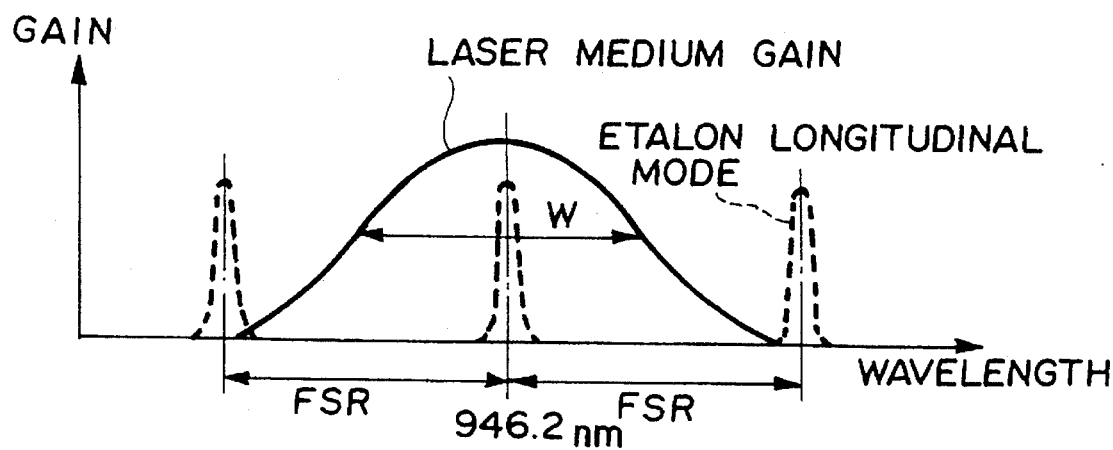
FIG. 2 is a graph showing the relationship between a gain of a laser medium and an etalon longitudinal mode in the first embodiment of FIG. 1.

In this laser diode pumped solid laser, as illustrated in FIG. 2, the gain peak wavelength of the Nd:YAG crystal 13 serving as the laser medium is 946.2 nm. Also, the full width W at half maximum gain at the 946 nm band is 0.8 nm. On the other hand, the free spectral range (FSR, which corresponds to the longitudinal mode interval) of the etalon 15 is set to be 0.8 nm, which is identical with the full width W at half maximum gain of the Nd:YAG crystal 13. Further, one etalon longitudinal mode is set to be 946.2 nm, which is identical with the gain peak wavelength of the Nd:YAG crystal 13.

As described above, in this laser diode pumped solid laser, the etalon longitudinal mode and the gain peak wavelength of the Nd:YAG crystal 13 coincide with each other. Therefore, the gain can be utilized efficiently. Accordingly, the problems can be prevented from occurring in that the threshold value of the pumping power for the oscillation of the laser becomes large and in that the output power of the laser becomes low. Further, the single longitudinal mode characteristics can be kept good. Furthermore, a means for adjusting the angle of inclination of the etalon for the purposes of adjusting the optical path length becomes unnecessary. Therefore, this laser diode pumped solid laser can be made at a comparatively low cost.

The FSR of the etalon 15 need not necessarily coincide with the full width W at half maximum gain of the Nd:YAG crystal 13. Such that the oscillation in the second longitudinal mode (the adjacent mode) of the etalon 15 may be prevented reliably, the FSR of the etalon 15 should preferably be set at a value not smaller than the full width W at half maximum gain of the Nd:YAG crystal 13.

Figure 3:
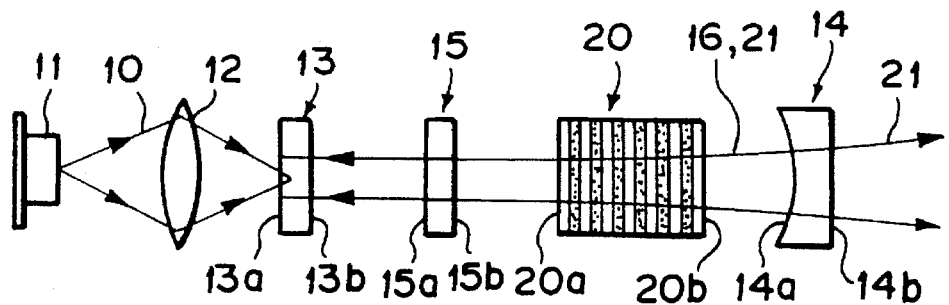
FIG. 3 is a side view showing a second embodiment of the single-longitudinal-mode laser in accordance with the present invention.

A second embodiment of the single-longitudinal-mode laser in accordance with the present invention will be described hereinbelow with reference to FIG. 3. In FIG. 3, similar elements are numbered with the same reference numerals with respect to FIG. 1.

The second embodiment of the single-longitudinal-mode laser in accordance with the present invention is constituted as a laser diode pumped solid laser. The second embodiment is basically different from the first embodiment in that an optical wavelength converting device 20 is located in the resonator. By way of example, the optical wavelength converting device 20 is constituted of a bulk crystal of MgO-doped LiNbO3 having a periodic domain inversion structure. With this configuration, the laser beam 16 having a wavelength of 946.2 nm in the single longitudinal mode can be obtained through the effects of the etalon 15. The laser beam 16 is converted by the optical wavelength converting device into its blue second harmonic 21 having a wavelength of 473.1 nm, which is one half of the wavelength of the laser beam 16.

The reflectivities or the transmittances of the end faces 13a and 13b of the Nd:YAG crystal 13, the light passage end faces 15a and 15b of the etalon 15, and the mirror surface 14a and the light radiating end face 14b of the resonator mirror 14 with respect to the wavelengths described above are adjusted as listed in the table below by the provision of appropriate coatings. In the table below, R represents the reflectivity in units of %, and T represents the transmittance in units of %.

|  | 13a | 13b | 15a | 15b | 14a | 14b |
|---|---|---|---|---|---|---|
| 809 nm | T ≧ 85 | R ≦ 2 | — | — | — | — |
| 946.2 nm | R ≧ 99.9 | R ≦ 0.1 | R = 15 | R = | R ≧ 99.9 | R ≦ 0.2 |
| 1064 nm | T ≧ 30 | R ≦ 10 | — | — | T ≧ 30 | R ≦ 10 |
| 1300 nm | T ≧ 70 | R ≦ 25 | — | — | T ≧ 70 | R ≦ 25 |
| 473.1 nm | R ≧ 98 | R ≦ 10 | R ≦ 1 | R ≦ 1 | T ≧ 93 | R ≦ 0.3 |

Also, end faces 20a and 20b of the optical wavelength converting device 20 have the reflectivities listed below.

|  | 20a | 20b |
|---|---|---|
| 946.2 nm | R ≦ 1 | R ≦ 1 |
| 473.1 nm | R ≦ 1 | R ≦ 1 |

With the configuration described above, the laser beam 16 having a wavelength of 946.2 nm does not substantially pass through the mirror surface 14a of the resonator mirror 14. Part of the second harmonic 21 having a wavelength of 473.1 nm passes through the mirror surface 14a and is radiated from the light radiating end face 14b. It was also confirmed that the second harmonic 21 is radiated in the single longitudinal mode.

With the second embodiment, the longitudinal mode of the etalon 15 and the gain peak wavelength of the Nd:YAG crystal 13 coincide with each other. Therefore, with the second embodiment, the same effects as those in the first embodiment can be obtained.

A third embodiment of the single-longitudinal-mode laser in accordance with the present invention will be described hereinbelow with reference to FIG. 10. The third embodiment is basically the same as the second embodiment except for that the arrangement of the optical wavelength converting device 20 and the etalon 15 is reversed.

With this configuration, the laser beam 16 having a wavelength of 946.2 nm in the single longitudinal mode can be obtained through the effects of the etalon 15. The laser beam 16 is converted by the optical wavelength converting device 20 into its blue second harmonic 21 having a wavelength of 473.1 nm, which is one half of the wavelength of the laser beam 16. It was confirmed that the second harmonic 21 was also in the single longitudinal mode.

Further, in this embodiment, the efficiency of wavelength conversion is enhanced and a higher output of the second harmonic is obtained in comparison with the second embodiment because the optical wavelength converting device 20 is located at a position where the diameter of the laser beam 16 is smaller.

How the etalon 15, the longitudinal mode of which coincides with the gain peak wavelength of the Nd:YAG crystal 13, is made will be described hereinbelow.

Figure 4:
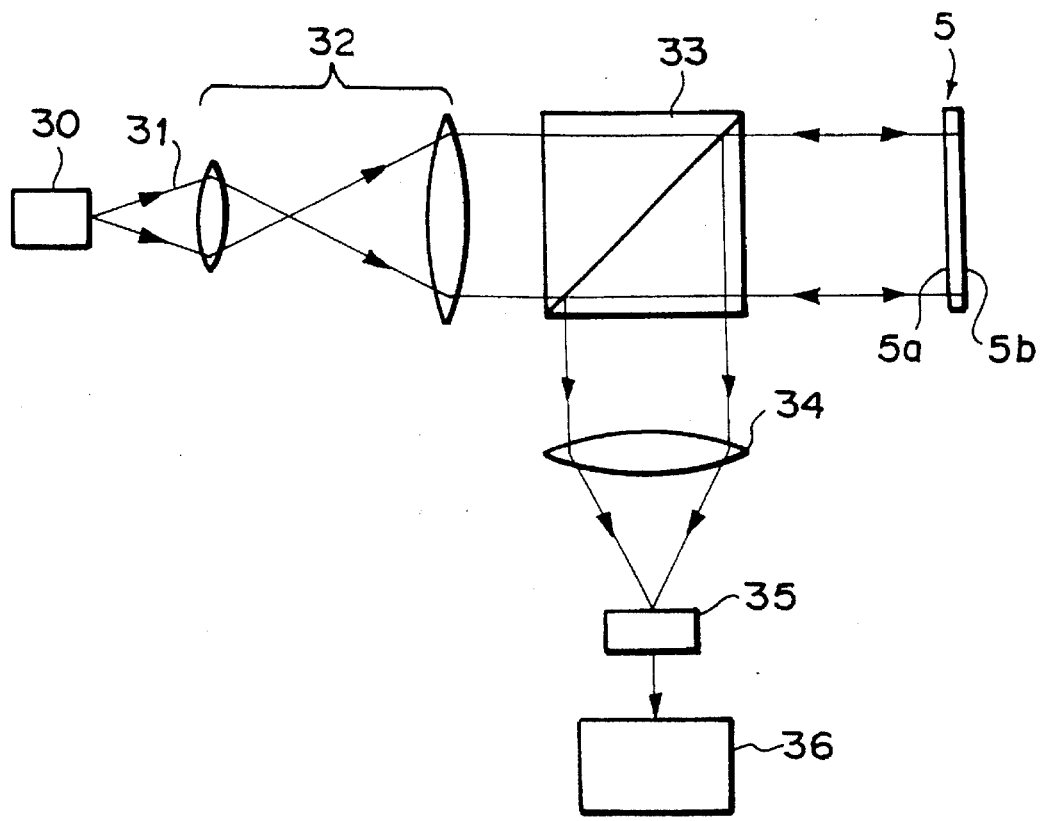
FIG. 4 is a side view showing an example of an apparatus for carrying out the first method for making an etalon in accordance with the present invention.

FIG. 4 shows an example of an apparatus for making the etalon 15 by applying the first method for making an etalon in accordance with the present invention. In this apparatus, as in the laser diode pumped solid lasers shown in FIGS. 1 and 3, a single-longitudinal-mode laser beam 31 is produced by a solid laser 30 provided with an Nd:YAG crystal as the laser medium. The laser beam 31 passes through a beam expander 32, and the beam diameter of the laser beam 31 is increased by the beam expander 32. The laser beam 31 then passes through a beam splitter 33 and impinges upon an etalon base plate 5.

By way of example, the etalon base plate 5 is constituted of a fused silica having a refractive index of 1.45. The etalon base plate 5 has a thickness of approximately 0.38 mm and is formed into a square, one side of which has a length of 50 mm. The area of the etalon base plate 5 is sufficiently larger than the area of the etalon 15 formed into a square, one side of which has a length of, for example, 3 mm.

Two surfaces 5a and 5b of the etalon base plate 5 (which later constitute the light passage end faces 15a and 15b of the etalon 15) are provided with predetermined coatings such that the etalon 15, which will later be obtained by being cut out of the etalon base plate 5, may have an appropriate level of finesse (i.e. an appropriate level of longitudinal mode selectivity). For example, as described above, in cases where the etalon 15 for use in the laser diode pumped solid laser shown in FIG. 1 is to be made, the surfaces 5a and 5b of the etalon base plate 5 are provided with the coatings such that the reflectivity R may be equal to 15% with respect to light having a wavelength of 946.2 nm.

The laser beam 31 is irradiated to the etalon base plate 5 from the side of one surface 5a. Part of the laser beam 31 is reflected by the surface 5a. The remainder of the laser beam 31 passes through the etalon base plate 5 and is thereafter reflected by the surface 5b. The laser beam 31, which has thus been reflected from the etalon base plate 5, is then reflected by the beam splitter 33 and converged by a condensing lens 34. A two-dimensional photodetector 35, which may be constituted of a CCD image sensor, or the like, is located at the position of convergence of the laser beam 31. An image formed by the laser beam 31 is recorded by the two-dimensional photodetector 35. The recorded image is reproduced as an enlarged image by a display means 36, which may be constituted of a cathode ray tube (CRT) display device, or the like.

Figure 5:
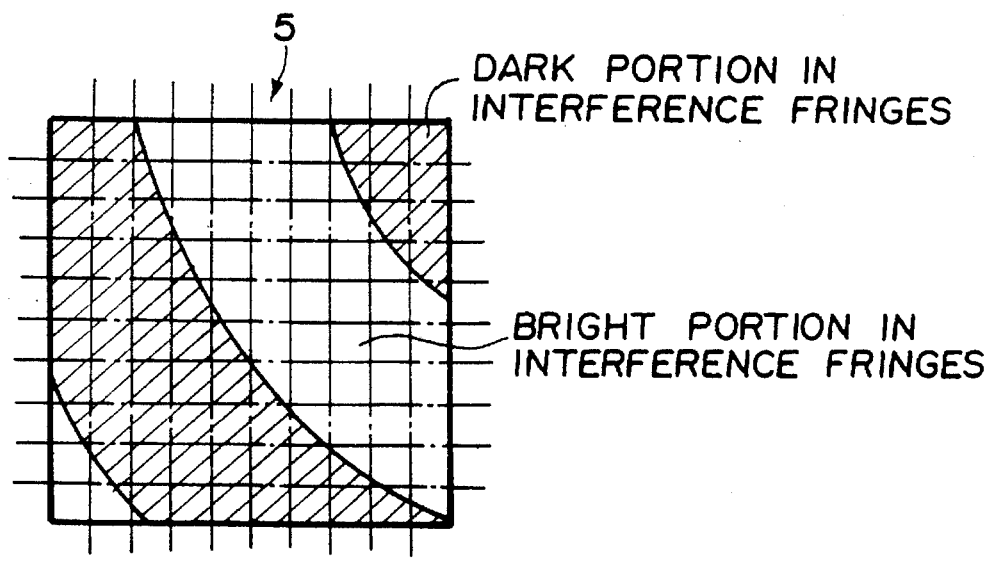
FIG. 5 is an explanatory view showing the relationship between the positions of interference fringes, which occur in the apparatus of FIG. 4, and the positions on an etalon base plate.

The etalon base plate 5 has been polished so as to form a parallel flat plate. However, in general, it is impossible to polish the etalon base plate 5 such that the two surfaces 5a and 5b may become perfectly parallel to each other. Specifically, the etalon base plate 5 inevitably has a thickness distribution. Therefore, as shown in, for example, FIG. 5, interference fringes occur due to the interference between the laser beam 31, which has been reflected from the surface 5a of the etalon base plate 5, and the laser beam 31, which has been reflected from the surface 5b of the etalon base plate 5. The image reproduced as an enlarged image on the display means 36 represents the interference fringes.

In the example of FIG. 4, a reflection type of interferometer is constituted. Therefore, a portion of the etalon base plate 5, which has a specific thickness such that, when the portion of the etalon base plate 5 is subdivided into etalons 15, 15, . . . , the longitudinal mode of each of the etalons 15, 15, . . . may coincide with the gain peak wavelength (946.2 nm) of the Nd:YAG crystal 13, is the portion corresponding to the dark portion in the interference fringes. Accordingly, the portion of the etalon base plate 5 corresponding to the dark portion in the interference fringes is subdivided in order to form the etalons 15, 15, . . . One of the etalons 15, 15, . . . is then located in the laser diode pumped solid laser of FIG. 1, 3 or 10 such that the end faces 15a and 15b may be normal to the resonator axis. In such cases, the longitudinal mode of the etalon 15 coincides with the gain peak wavelength of the Nd:YAG crystal 13.

In cases where a transmission type of interferometer is utilized, the portion of the etalon base plate 5 corresponding to the bright portion in the interference fringes may be subdivided in order to form etalons 15, 15, . . . In such cases, the longitudinal mode of the etalon 15 coincides with the gain peak wavelength of the Nd:YAG crystal 13.

With the first method for making an etalon in accordance with the present invention, in cases where the etalon base plate 5 having a square shape, one side of which has a length of 50 mm, is cut into etalons 15, 15, each having a square shape, one side of which has a length of 3 mm, at least 100 pieces of etalons 15, 15, the longitudinal mode of which coincides with the gain peak wavelength of the Nd:YAG crystal 13, can be made with a single simultaneous procedure.

How the etalon base plate 5 is to be cut may be determined in advance. The predetermined cutting lines (which are indicated by the chained line in FIG. 5) may then be superimposed upon the interference fringes on the display means 36. In such cases, it can be found clearly whether a cut piece at which row and at which column in the array of cut pieces defined by the cutting lines belongs or does not belong to the dark portion in the interference fringes and can or cannot be utilized as the etalon 15. Therefore, the efficiency, with which the etalons are made, can be kept high.

A different example of how the etalon 15, the longitudinal mode of which coincides with the gain peak wavelength of the Nd:YAG crystal 13, is made will be described hereinbelow.

FIG. 6 shows an example of an apparatus for making the etalon 15 by applying the second method for making an etalon in accordance with the present invention. In this apparatus, an evaluation laser apparatus is utilized. The evaluation laser apparatus comprises a semiconductor laser (a phased array laser) 41, which produces a laser beam 40 serving as a pumping beam, and a condensing lens 42, which converges the laser beam 40 produced as a divergent beam. The evaluation laser apparatus also comprises an Nd:YAG crystal 43 and a resonator mirror 44.

As in the Nd:YAG crystal 13 constituting the laser diode pumped solid laser shown in FIG. 1, 3 or 10, the Nd:YAG crystal 43 has the gain peak wavelength of 946.2 nm. Also, the resonator of the evaluation laser apparatus is constituted of the Nd:YAG crystal 43 and the resonator mirror 44. The etalon base plate 5, which is of the same type as that described above, is located in the resonator.

The etalon base plate 5 serves as the etalon in the evaluation laser apparatus, and a laser beam 45 is thereby brought to the single longitudinal mode. The laser beam 45 is condensed by the condensing lens 46 and impinges upon an optical fiber bundle 47. The laser beam 45 propagates through the optical fiber bundle 47 and is guided to an optical spectrum analyzer 48. The optical spectrum analyzer 48 measures the oscillation wavelength of the laser beam 45 and generates a signal S1 representing the results of the measurement. The signal S1 is fed into a computer 49.

The computer 49 feeds a drive control signal S2 to a two-dimensional movement stage 50, which supports the etalon base plate 5. The two-dimensional movement stage 50 is operated in accordance with the drive control signal S2 and moves the etalon base plate 5 with respect to the laser beam 45 in two directions, i.e. vertically and in the direction normal to the plane of the sheet of FIG. 6. In this manner, the etalon base plate 5 is scanned with the laser beam 45 in two directions.

As described above, the etalon base plate 5 has a thickness distribution. Therefore, the oscillation wavelength of the laser beam 45 varies for different positions on the etalon base plate 5 that are being scanned with the laser beam 45. The computer 49 receives a signal S3, which represents the movement position of the two-dimensional movement stage 50 (i.e. the position on the etalon base plate 5 that is being scanned with the laser beam 45), from the two-dimensional movement stage 50. The computer 49 investigates which signal S1 corresponds to which signal S3 and creates a map, which represents the oscillation wavelength of the laser beam 45 for each of different positions on the etalon base plate 5.

In this manner, a map as shown in, for example, FIG. 7 is obtained. The map is displayed on a display means 51, which may be constituted of a CRT display device, or the like. Therefore, from the displayed map, it can be known which portion of the etalon base plate 5 is to be cut in order to obtain an etalon 15 having the longitudinal mode coinciding with the gain peak wavelength of the Nd:YAG crystal 13. For example, in the example shown in FIG. 7, in cases where an error of ±0.2 nm is allowed for the etalon longitudinal mode with respect to the gain peak wavelength of 946.2 nm of the Nd:YAG crystal 13, the portion of the etalon base plate 5 hatched in FIG. 7 may be cut in order to obtain the etalon 15. The longitudinal mode of the etalon 15, which is obtained in this manner, coincides with the gain peak wavelength of the Nd:YAG crystal 13.

With the second method for making an etalon in accordance with the present invention, in cases where the etalon base plate 5 having a square shape, one side of which has a length of 50 mm, is cut into etalons 15, 15, each having a square shape, one side of which has a length of 3 mm, at least 100 pieces of etalons 15, 15, . . . , the longitudinal mode of which coincides with the gain peak wavelength of the Nd:YAG crystal 13 (with an error falling within the range of ±0.2 nm), can be made with a single simultaneous procedure.

How the etalon base plate 5 is to be cut may be determined in advance. The predetermined cutting lines (which are indicated by the chained line in FIG. 5) may then be superimposed upon the map on the display means 51. In such cases, it can be found clearly whether a cut piece at which row and at which column in the array of cut pieces defined by the cutting lines can or cannot be utilized as the etalon 15. Therefore, the efficiency, with which the etalons are made, can be kept high.

A further different example of how the etalon 15, the longitudinal mode of which coincides with the gain peak wavelength of the Nd:YAG crystal 13, is made will be described hereinbelow.

Figure 8:
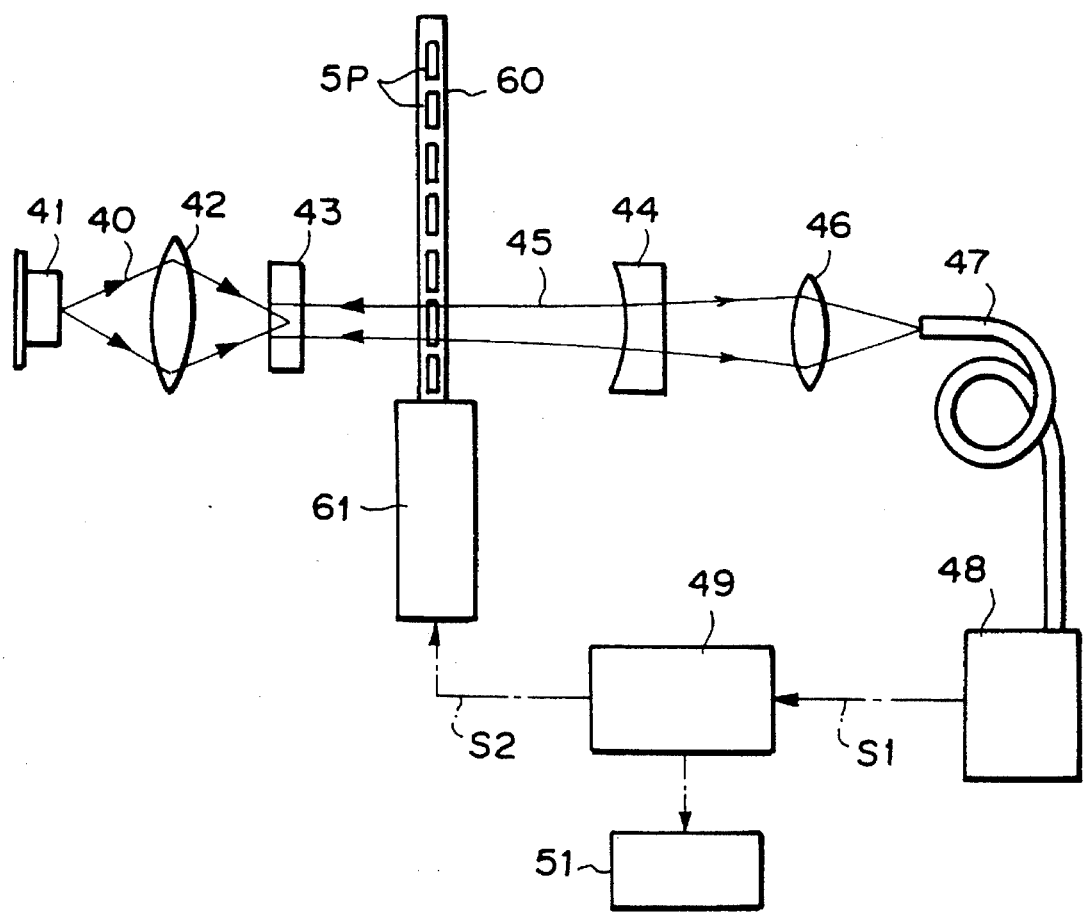
FIG. 8 is a side view showing an example of an apparatus for carrying out the third method for making an etalon in accordance with the present invention.

FIG. 8 shows an, example of an apparatus for making the etalon 15 by applying the third method for making an etalon in accordance with the present invention. Basically, this apparatus is different from the apparatus of FIG. 6 in that a jig 60, which supports a plurality of base plate small pieces 5P, 5P, . . . , is located in lieu of the etalon base plate 5, and in that a one-dimensional movement stage 61 is employed in lieu of the two-dimensional movement stage 50.

Figure 9:
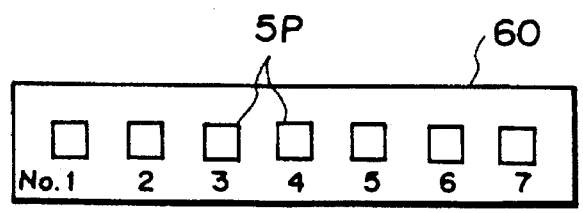
FIG. 9 is an enlarged front view showing part of the apparatus of FIG. 8.

The base plate small pieces 5P, 5P, . . . are obtained by cutting the etalon base plate 5 having a comparatively large area into small pieces having the same size as the size of the etalon. As illustrated in FIG. 9, the base plate small pieces 5P, 5P, . . . are supported in a line on the jig 60. Also, the jig 60 is supported by the one-dimensional movement stage 61 such that the solid laser beam (i.e. the evaluation laser beam) 45 may impinge upon the two surfaces of each of the base plate small pieces 5P, 5P, . . .

Each of the base plate small pieces 5P, 5P, . . . serves as the etalon in the evaluation laser apparatus, and the laser beam 45 is thereby brought to the single longitudinal mode. As in the apparatus of FIG. 6, the oscillation wavelength of the laser beam 45 is measured by the optical spectrum analyzer 48. Also, the signal S1, which is generated by the optical spectrum analyzer 48 and represents the results of the measurement, is fed into the computer 49. The one-dimensional movement stage 61 is operated in accordance with the drive control signal S2, which is received from the computer 49. The one-dimensional movement stage 61 intermittently moves the jig 60 vertically at the same pitches as the pitches at which the base plate small pieces 5P, 5P, . . . are mounted.

When the jig 60 is thus moved, the plurality of the base plate small pieces 5P, 5P, . . . , which are mounted on the jig 60, are located one after another at the position for exposure to the laser beam 45 in the resonator. As described above, the etalon base plate 5 has a thickness distribution, and therefore the thicknesses of the plurality of the base plate small pieces 5P, 5P, . . . , which have been cut from the etalon base plate 5, are not necessarily identical with one another. Therefore, the oscillation wavelength of the laser beam 45 varies in accordance with the thickness of each of the base plate small pieces 5P, 5P, . . . located in the resonator.

Each time the one-dimensional movement stage 61 is moved a distance equal to a single pitch, i.e. each time one of the base plate small pieces 5P, 5P, . . . is located at the position for exposure to the laser beam 45, the computer 49 makes a judgment as to whether the oscillation wavelength of the laser beam 45, which is represented by the received signal S1, coincides or does not coincide with the gain peak wavelength of 946.2 nm of the Nd:YAG crystal 13 with a tolerance of, for example, ±0.2 nm. A list representing the results of the judgments are displayed on the display means 51. With the list, the results of the judgments are displayed in association with the order, in which the base plate small pieces 5P, 5P, . . . are located one after another in the resonator. For example, the list represents "No. 1 =OK No. 2 =OK No. 3 =NG . . . " The order, in which the base plate small pieces 5P, 5P, . . . are located one after another in the resonator, corresponds to the order, in which the base plate small pieces 5P, 5P, . . . are arrayed in a line on the jig 60. Therefore, as illustrated in FIG. 9, the order can be indicated on the jig 60.

The base plate small piece 5P, which is indicated as being OK in the list, is selected and utilized as the etalon 15. The etalon 15 thus obtained is used in the laser diode pumped solid laser of FIG. 1, 3 or 10. The longitudinal mode of the etalon 15 thus obtained coincides with the gain peak wavelength of the Nd:YAG crystal 13 with an error falling within the range of ±0.2 nm.

With the third method for making an etalon in accordance with the present invention, in cases where the etalon base plate 5 having a square shape, one side of which has a length of 50 mm, is cut into etalons 15, 15, each having a square shape, one side of which has a length of 3 mm, the etalons 15, 15, . . . , the longitudinal mode of which coincides with the gain peak wavelength of the Nd:YAG crystal 13 (with an error falling within the range of ±0.2 nm), can be made with a yield of approximately 50%.

Instead of the one-dimensional movement stage 61, which is provided with a drive source, and the computer 49 being used, the base plate small pieces 5P, 5P, . . . may be manually located one after another at the position for exposure to the laser beam 45. Each time one of the base plate small pieces 5P, 5P, . . . is manually located at the position for exposure to the laser beam 45, the oscillation wavelength of the laser beam 45, which is displayed by the optical spectrum analyzer 48, may be read out, and a judgment may be made as to whether each base plate small piece 5P can or cannot be utilized as the etalon 15.

What is claimed is:

1. An etalon, which is disposed in a resonator of a laser apparatus provided with a laser medium, wherein said etalon comprises:

a first light passage end face; and a second light passage end face substantially parallel to said first light passage end face, wherein said etalon brings a laser beam to a single longitudinal mode, wherein said etalon is disposed such that said laser beam impinges at a predetermined angle upon said first and second light passage end faces of said etalon, wherein said single longitudinal mode of said etalon coincides with a peak gain of a wavelength band of the laser medium, and wherein a distance between said single longitudinal mode of said etalon and an adjacent longitudinal mode of said etalon is greater than or equal to a width of said wavelength band of said laser medium at half of said peak gain such that oscillation in said adjacent longitudinal mode is prevented.

2. A single-longitudinal-mode laser comprising:

a resonator having a resonator axis;

a laser medium disposed in said resonator;

an etalon disposed in said resonator and having first and second light passage end faces, wherein said first and second light passage end faces are parallel to each other and make a predetermined angle with respect to said resonator axis, wherein a single longitudinal mode of said etalon coincides with a peak gain of a wavelength band of said laser medium, and wherein a distance between said single longitudinal mode of said etalon and an adjacent longitudinal mode of said etalon is greater than or equal to a width of said wavelength band of said laser medium at half of said peak gain such that oscillation in said adjacent longitudinal mode is prevented.

3. A single-longitudinal-mode laser as defined in claim 2 wherein said predetermined angle is approximately 90°.

4. The single-longitudinal-mode laser as defined in claim 2, further comprising:

an optical wavelength converting device disposed along said resonator axis of said resonator.

5. The single-longitudinal-mode laser as defined in claim 4, further comprising:

a resonator mirror having a mirror surface, wherein said resonator is partially formed by said mirror surface of said resonator mirror, and wherein said optical wavelength converting device is disposed between said etalon and said mirror surface of said resonator mirror.

6. The single-longitudinal-mode laser as defined in claim 4, wherein:

said resonator is partially formed by an end face of said laser medium, and said optical wavelength converting device is disposed between said etalon and said end face of said laser medium.

7. A method for making an etalon for use in a resonator of a laser apparatus provided with a laser medium and for bringing a laser beam to a single longitudinal mode, the method comprising the steps of:

i) irradiating an etalon base plate with a single-longitudinal-mode laser beam which has a wavelength identical with a gain peak wavelength of the laser medium of the laser apparatus, wherein said etalon base plate has an area larger than the area of a desired etalon, wherein said etalon base plate is irradiated from the side of one surface of the etalon base plate, and wherein said single-longitudinal-mode laser beam creates interference fringes in said etalon base plate when said single-longitudinal-mode laser beam passes through said etalon base plate, ii) determining which portion of said interference fringes formed by the single-longitudinal-mode laser beam have a predetermined brightness iii) subdividing a portion of the etalon base plate, which corresponds to said portion of said interference fringes having said predetermined brightness, into small pieces, and iv) using at least one of the small pieces as the etalon.

8. A method for making an etalon for use in a resonator of a laser apparatus provided with a laser medium and for bringing a laser beam to a single longitudinal mode, the method comprising the steps of:

i) inserting an etalon base plate, which has an area larger than the area of a desired etalon, into a resonator of an evaluation laser apparatus provided with the same laser medium as the laser medium of the laser apparatus for which the etalon is to be used, ii) scanning the etalon base plate in two dimensions with an evaluation laser beam, which has been produced by the evaluation laser apparatus, iii) measuring a wavelength of the evaluation laser beam as the evaluation laser beam passes through each position of the etalon base plate during the two-dimensional scanning of the etalon base plate, iv) creating a map which represents the wavelength of the evaluation laser beam for said each position of the etalon base plate, v) subdividing a portion of the etalon base plate into small pieces, wherein said portion corresponds to positions on said map in which the wavelength of the evaluation laser beam is identical with a gain peak wavelength of the laser medium, and vi) using at least one of the small pieces as the etalon.

9. A method for making an etalon, for use in a resonator of a laser apparatus provided with a laser medium and for bringing a laser beam to a single longitudinal mode, the method comprising the steps of:

i) subdividing an etalon base plate, which has an area larger than the area of a desired etalon, into a plurality of small pieces, ii) inserting the small pieces one after another into a resonator of an evaluation laser apparatus provided with the same laser medium as the laser medium of the laser apparatus for which the etalon is to be used, iii) measuring a wavelength of an evaluation laser beam, which has been produced by the evaluation laser apparatus and which has passed through one of the small pieces, for each of the small pieces when the small pieces are inserted one after another into the resonator of the evaluation laser apparatus, iv) selecting a small piece, for which the wavelength of the evaluation beam is identical with a gain peak wavelength of the laser medium of the laser apparatus, and v) using the selected small piece as the etalon.

* * * * *